(12) United States Patent
Wada

(10) Patent No.: US 6,904,607 B2
(45) Date of Patent: Jun. 7, 2005

(54) OPTICAL PICKUP

(75) Inventor: Mitsunori Wada, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 147 days.

(21) Appl. No.: 10/354,895

(22) Filed: Jan. 30, 2003

(65) Prior Publication Data

US 2003/0161228 A1 Aug. 28, 2003

(30) Foreign Application Priority Data

Feb. 7, 2002 (JP) ......................................... 2002-031150

(51) Int. Cl.$^7$ ............................ G11B 7/08; G11B 17/00
(52) U.S. Cl. ................................... 720/684; 369/249.1
(58) Field of Search ......................... 720/684; 369/248, 369/249.1, 44.14, 44.32; 359/814, 823, 824

(56) References Cited

U.S. PATENT DOCUMENTS

| 5,666,235 A | | 9/1997 | Izuka |
| 6,091,553 A | * | 7/2000 | Song et al. .................. 359/813 |
| 6,570,828 B2 | * | 5/2003 | Kikuchi et al. .......... 369/44.32 |
| 6,704,255 B2 | * | 3/2004 | Tanaka ..................... 369/44.14 |

FOREIGN PATENT DOCUMENTS

| JP | 10-124895 | | 5/1998 |
| JP | 2003-233919 A | * | 8/2003 |

* cited by examiner

*Primary Examiner*—Allen Cao
(74) *Attorney, Agent, or Firm*—Brinks Hofer Gilson & Lione

(57) ABSTRACT

In an optical pickup including a supporting member for movably supporting a lens holder through a plurality of linear spring members, a holding member is provided between the lens holder and the supporting member and having holes for accommodating a plurality of linear spring members, and a damper gel is filled in the holes in the holding member for damping deflection of the linear spring member. Gaps are formed between the edge defining an opening of the hole on the holding member opened toward the supporting member and the supporting member, and the damper gel is not filled around the linear spring member at the closest position with respect to the optical disk but is filled around other linear spring members. Accordingly, when wiping off dirt attached to the objective lens, the damper gel is prevented from attaching on projections of the cleaner even when the projections pass through the gap formed between the holding member and the supporting member.

18 Claims, 5 Drawing Sheets

OPTICAL PICKUP

BACKGROUND OF THE INVENTION

1. Field of the Invention

The present invention relates to an optical pickup for recording information on an optical disk such as a DVD (digital versatile disk) and/or reproducing information recorded on the optical disk, and, more specifically, to an optical pickup in which a linear spring member for movably supporting a lens holder is surrounded by damper gel so as to be capable of actively damping deflection of the linear spring member.

2. Description of the Related Art

Conventionally, the optical pickup for recording on and/or reproducing information from the optical disk such as a DVD includes an objective lens for converging a light beam on the optical disk, a lens holder for holding an objective lens, a magnetic drive mechanism for driving the lens holder in the focusing direction and in the tracking direction, a supporting mechanism movably supporting the lens holder and functioning as a suspension for the lens holder, and a chassis for mounting a light-emitting element, a light-receiving element, and various optical components.

The magnetic drive mechanism includes a focus coil and a tracking coil mounted on the lens holder and a magnetic circuit, and the focus coil and the tracking coil are arranged so as to provide transverse magnetic flux from the magnetic circuit.

The supporting mechanism includes a plurality of linear springs fixed at one end to the lens holder, a supporting member functioning as a leaf spring that bends in the direction of the length of the linear spring and supporting the linear spring at the other end, a damper gel formed of gelatinous material surrounding the linear spring for actively damping deflection mainly in the direction of focus, that is, pitching, and a holding member provided between the lens holder and the supporting member, with the holding member including holes through which the plurality of linear springs are inserted, and the damper gel being held in the holes. There is provided a gap between the holding member for holding the damper gel and the linear springs, and the gap is entirely filled with the damper gel.

In the optical pickup thus constructed, information is recorded/reproduced by irradiating a light beam converged through the objective lens on a data track on the optical disk. In this case, focus servo control that controls a spot of light beam to be focused on the data track, and tracking servo control that controls the spot of light beam to follow the data track are performed.

In other words, when the optical pickup is under focus servo control, a current flows through the focus coil to generate an electromagnetic force in the direction of the optical axis of the objective lens and the lens holder is driven in the direction of the optical axis of the objective lens, so that the spot of the light beam is exactly focused on the data track. On the other hand, when the optical pickup is under tracking servo control, a current flows through the tracking coil to generate an electromagnetic force in the direction orthogonal to the optical axis of the light beam, and the lens holder is driven in the direction orthogonal to the optical axis of the objective lens, so that the spot follows the data track.

When the lens holder is being driven in this manner, the linear spring and the supporting member function as suspensions respectively for deflections of the lens holder in the direction of focus and for deflection of the same in the direction of tracking. In this case, deflection in the direction of focus, deflection in the direction of tracking, and rotation about the radial axis (in the direction of the radius of the optical disk) or pitching of the linear spring itself are actively damped by the damper gel.

The optical pickup of this type tends to be thinner, and thus the distance between the holding member for holding the damper gel and the optical disk is set to a small value. Therefore, in the conventional optical pickup described above, when a cleaner having projections such as a brush or the like is used on the optical disk for wiping off dirt attached to the optical lens, the projections of the cleaner come into contact with the damper gel filling the gap between the holding member for holding the damper gel and the supporting member for supporting the linear spring, which may result in the damper gel being inadvertently attached to the objective lens.

SUMMARY OF THE INVENTION

In order to solve the problem described above, it is an object of the present invention to provide an optical pickup that can prevent the projections of a cleaner for cleaning dirt attached to the objective lens from being brought into contact with the damper gel.

In order to achieve this object, the optical pickup of the invention includes an objective lens for converging a light beam on an optical disk, a lens holder for holding the objective lens, a plurality of linear spring members fixed at one end to the lens holder and fixed at the other end to the supporting member for supporting the lens holder so as to be capable of moving at least in the direction of the optical axis of the objective lens with respect to the supporting member, a damper gel surrounding the linear spring member to damp deflection of the linear spring member, and a holding member provided between the lens holder and the supporting member, with the holding member including holes through which the linear spring members are inserted, and the damper gel being held in the holes, wherein the plurality of linear spring members are disposed in parallel at intervals in the direction of the optical axis of the objective lens, a gap is formed between the supporting member and the edge defining the opening of the hole opened toward the supporting member for holding the damper gel, and the damper gel does not fill the portion of the gap around the linear spring member at the closest position with respect to the optical disk, and is filled around other linear spring members in the gap.

In the invention thus constructed, since the damper gel is not filled around the linear spring member at the closest position with respect to the optical disk in the gap formed between the supporting member and the edge defining the opening of the hole opened toward the supporting member for holding the damper gel, when the projections of the cleaner pass through the gap between the holding member and the supporting member for wiping off dirt attached to the objective lens, the damper gel is not brought into contact with the projections.

Since the damper gel does fill the gap at the position around linear spring members other than the linear spring member at the position closest to the optical disk, the function of damping deflection of the linear spring members is not hindered.

In the construction described above, when the plurality of linear spring members are disposed in parallel on both sides of the lens holders in pairs respectively, two holes are formed on the holding member so that the pair of linear spring members are inserted into the respective hole, the damper gel is not filled around the linear spring members that are positioned closer to the optical disk out of the pairs of linear spring members, the damper gel is filled around the linear spring members that are positioned farther away from the optical disk out of the pairs of the linear spring members, and the damper gel is not exposed at the base portions of the linear spring members positioned closer to the optical disk out of the pairs of the linear spring members.

The construction described above may be modified so that the hole on the holding member includes a plurality of branch holes that are branched at a position near the opening on the supporting member side of the holding member for inserting the linear spring members respectively, and the damper gel is not filled in a gap between the supporting member and the edge defining the opening of the branch hole opened toward the supporting member at the closest position with respect to the optical disk, but fills the gap between the supporting member and the edge defining the opening of other branch holes opened toward the supporting member.

In the construction described above, by setting the gap between the supporting member and the edge defining the opening of the branch hole at the closest position with respect to the optical disk out of the plurality of branch holes opened toward the supporting member to a value larger than the gap between the supporting member and the edge defining the openings of other branch holes opened toward the supporting member, even when the damper gel temporarily protrudes from the opening of the branch hole at the closest position with respect to the optical disk when the damper gel is injected into the hole on the holding member in a predetermined quantity under a predetermined pressure, the damper gel may be prevented from being brought into contact with the supporting member, and only the damper gel projecting from the openings of the branch holes other than the branch hole at the closest position with respect to the optical disk may fill the gap. Therefore, the damper gel can be injected into the predetermined position in the gap by only one filling operation.

In the construction described above, by setting the area of the opening of the branch hole at the closest position with respect to the optical disk out of the plurality of branch holes opened toward the supporting member to a value smaller than the area of the opening of other branch holes opened toward the supporting member, the quantity of the damper gel flowing out from the opening of the branch hole at the closest position with respect to the optical disk into the gap may be reduced relative to the quantity of the damper gel flowing out from the openings of other branch holes into the gap when the damper gel is injected into the holes on the holding member. Therefore, the damper gel may be prevented from filling the gap on the optical disk side.

In the construction described above, by providing a filler hole for injecting the damper gel into the holes on the holding member at a position not facing toward the optical disk, the projections of the cleaner may be prevented from being brought into contact with damper gel exposed from the filler hole.

In the construction described above, by communicating the filler hole with a branch hole other than the branch hole at the closest position with respect to the optical disk out of the plurality of branch holes, when the damper gel is filled therein, abrupt flow-in of the damper gel into the branch hole at the closest position with respect to the optical disk may be prevented. Therefore, in this case as well, the damper gal may be prevented from flowing out of the opening of the branch hole opened toward the supporting member, and the damper gel is reliably prevented from filling the gap near the optical disk.

DESCRIPTION OF THE PREFERRED EMBODIMENTS

Figure 1:
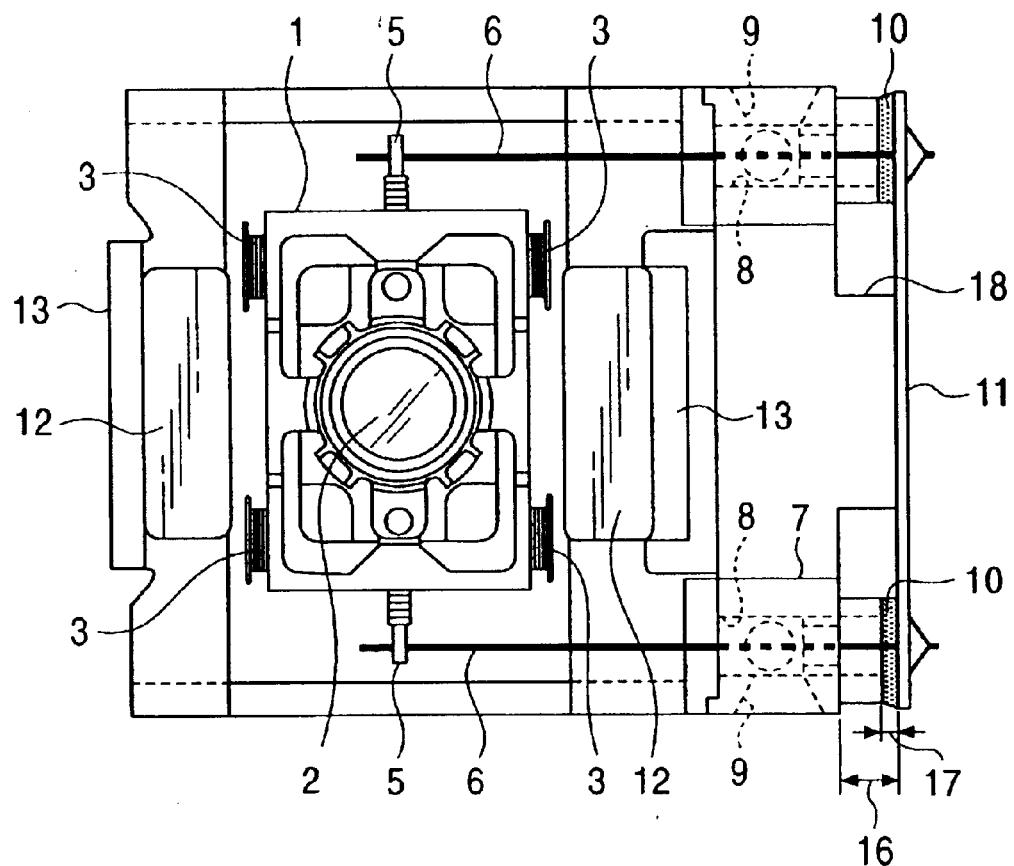
FIG. 1 is a plan view showing an optical pickup according to the first embodiment of the invention.

Referring now to the drawings, an embodiment of the optical pickup according to the invention will be described.

Figure 2:
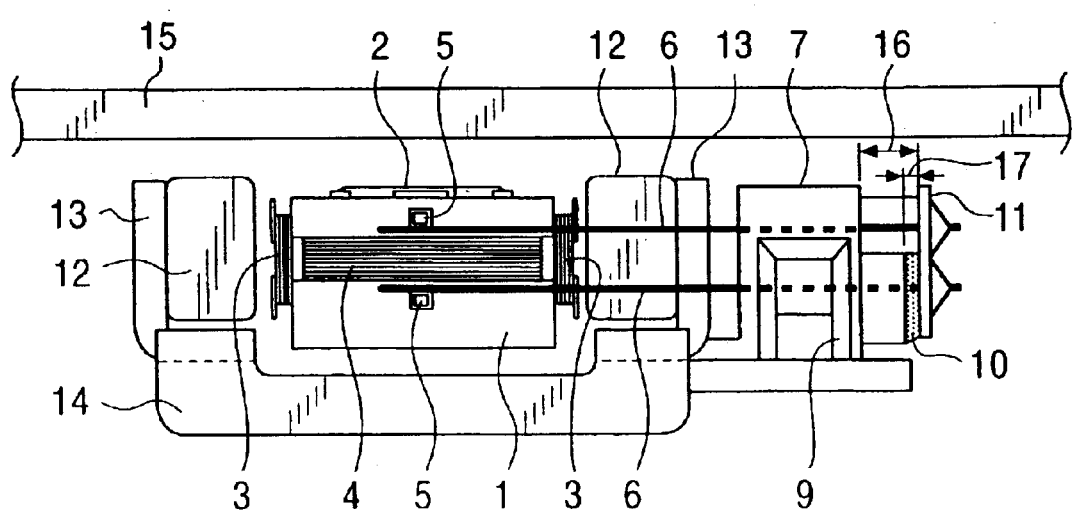
FIG. 2 is a side view of the optical pickup according to the present embodiment.
Figure 3:
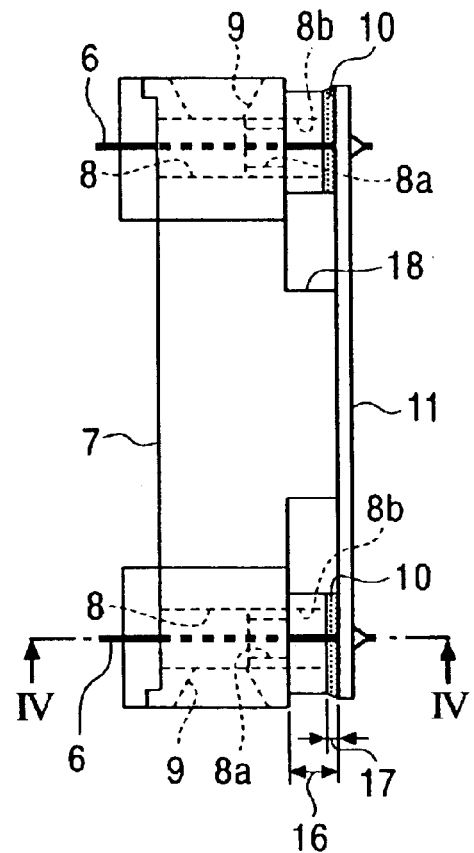
FIG. 3 is a plan view showing a principal portion of the optical pickup according to the present embodiment.

The optical pickup of the present embodiment records information on an optical disk such as a DVD and/or reproduces information recorded on the optical disk, and, as shown in FIGS. 1 and 2, includes an objective lens 2 for converging a light beam onto an optical disk 15, a lens holder 1 for holding the objective lens 2, a magnetic drive mechanism for driving the lens holder 1 in the focusing direction (vertical direction in FIG. 2) and the tracking direction (vertical direction in FIG. 1), a supporting mechanism for supporting the lens holder 1 so as to be capable of moving in the focusing direction and in the tracking direction and functioning as a suspension for the lens holder 1, and a chassis for mounting a light-emitting and light-receiving elements or various optical components.

The magnetic drive mechanism includes a focus coil 4 wound around the side surface of the lens holder 1 about the winding axis extending in the direction of the optical axis of the objective lens 2, tracking coils 3 wound on opposite side surfaces of the lens holder 1 about the winding axis extending orthogonal to the optical axis of the objective lens 2 (lateral direction in FIG. 1) in pairs on the respective sides, two permanent magnets 12 for generating magnetic flux traversing the focus coil 4 and the tracking coil 3, the two permanent magnets 12 being disposed so as to face each other with the lens holder 1 interposed therebetween in the direction orthogonal to the optical axis of the light beam, two yokes 13 formed of permeable metal on which the two permanent magnets 12 are respectively mounted, and a yoke base 14 bent and formed integrally with the yoke 13.

A pair of supporting mechanisms are disposed on each side of the lens holder 1 in the tracking direction so as to be spaced from each other, and the supporting mechanism includes a terminal plate 5 on which the terminal of the tracking coil 3 and the terminal of the focus coil 4 are wound respectively. A total of four linear springs 6 are fixed at one end to a respective terminal plate 5 by soldering, and each linear spring 6 is fixed at the other end by soldering to a supporting member 11 formed of a flexible member that bends in the direction of the length of the linear spring 6, for example, a FPC (flexible print circuit board). A damper gel 10 formed of an ultraviolet curing gelatinous material partly surrounds the end of each linear spring 6 for actively damping deflection in the focusing direction and pitching of the linear spring 6. A holding member 7 is provided between the lens holder 1 and the supporting member 11 and includes holes 8 formed in pairs on each side in the tracking direction through which the linear springs 6 are inserted in pairs respectively, the holes 8 holding damper gel 10 therein.

The linear spring 6 functions as a suspension for the action of the lens holder 1 in the focusing direction and the tracking direction, and also functions to conduct drive current to the tracking coil 3 and the focus coil 4 through the terminal plate 5. The linear springs 6 are disposed in parallel on each side of the lens holder 1 in pairs and spaced from each other in the direction of the optical axis of the objective lens 2. A linear spring 6 is formed by cutting a length of metallic wire into sections of a predetermined length. For its function as a linear spring member (resilient member), a wire of synthetic resin-, or a resilient member formed of a length of coiled wire and extending linearly may be used as the linear spring 6.

The supporting member 11 is capable of bending in the direction of the length (lateral direction in FIG. 1) of the linear spring 6 at the ends thereof by fixing the longitudinal center of the supporting member 11 to a central projection 18 of the holding member 7.

The supporting member 7 is formed of transparent resin material, so that the damper gel 10 filled in the hole 8 may be viewed, and the damper gel 10 may be cured by being irradiated with ultraviolet light from the outside of the holding member 7.

In the present embodiment, the supporting member 7 preferably is constructed as shown in FIG. 3 to FIG. 9.

Figure 4:
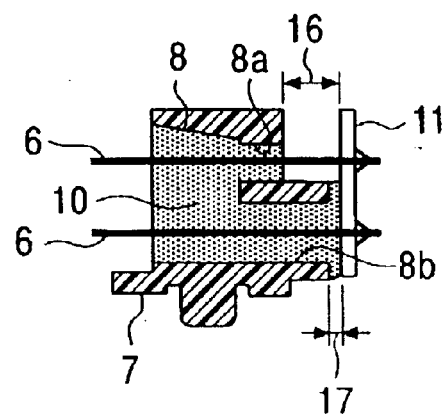
FIG. 4 is a cross sectional view taken along the line IV—IV in FIG. 3.
Figure 5:
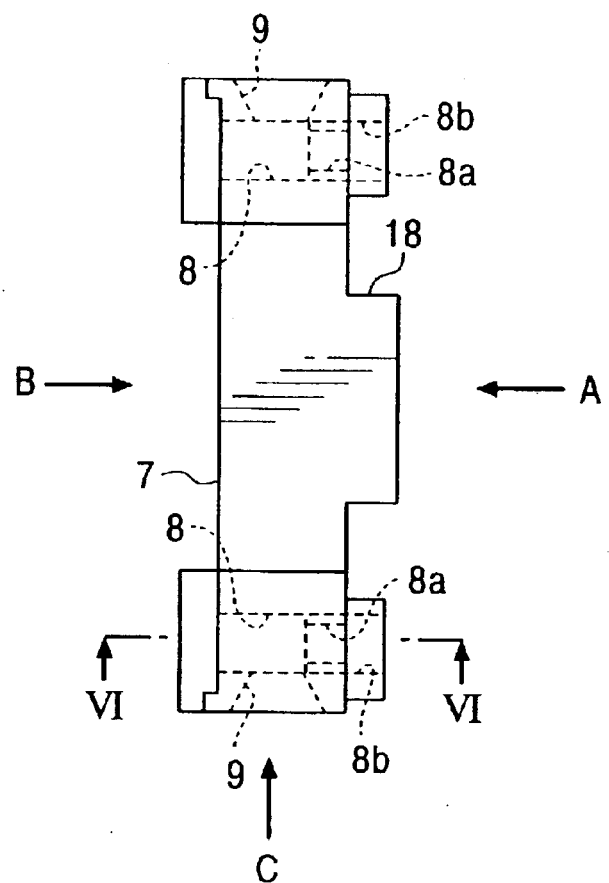
FIG. 5 is a plan view showing a holding member for holding the damper gel provided on the optical pickup of the present embodiment.
Figure 6:
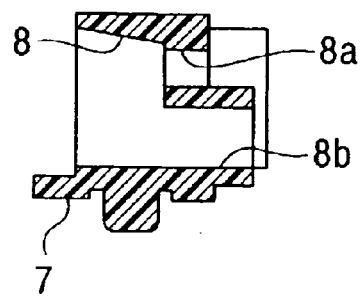
FIG. 6 is a cross sectional view taken along the line VI—VI in FIG. 5.

In other words, two linear springs 6 disposed on each side of the holding member 7 are spaced apart in the direction of the optical axis of the objective lens 2 as shown in FIGS. 2 and 4, and the hole 8 is branched at the side of the holding member 7 opened toward the supporting member 11 into first and second branch holes 8a, 8b for allowing the respective linear springs 6 to pass through. There is formed a gap 16 for preventing the damper gel 10 protruded from the opening of the first branch hole 8a at a position closer to an optical disk 15 than the second branch hole 8b opened toward the supporting member 11 from coming into contact with the supporting member 11 when the damper gel 10 is filled from between the edge defining the opening of the first branch hole 8a and the supporting member by a predetermined quantity under a predetermined pressure.

Formed between the edge defining the opening of the second branch hole 8b opened toward the supporting member 11 and the supporting member 11 is a gap 17 to be filled with the damper gel 10 protruding from the opening of the second branch hole 8b opened toward the supporting member 11 so as to be in contact with the supporting member 11 when the damper gel 10 is filled into the hole 8. The gap 17 is significantly narrower with respect to the gap 16 described above.

Figure 7:
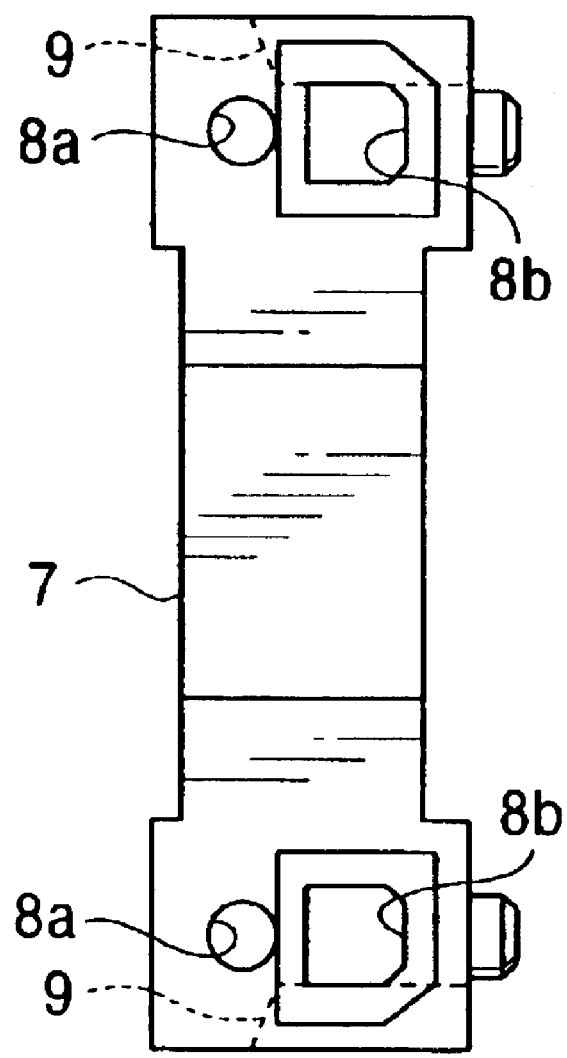
FIG. 7 is a drawing viewed in the direction indicated by an arrow A in FIG. 5.
Figure 8:
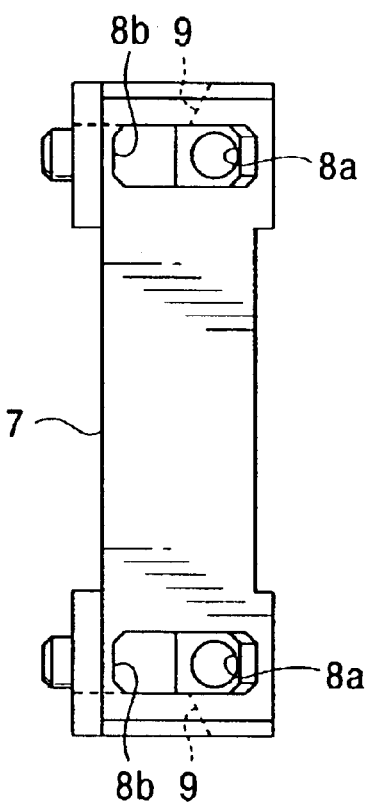
FIG. 8 is a drawing viewed in the direction indicated by an arrow B in FIG. 5.

As shown in FIGS. 7 and 8, the area of the opening of the first branch hole 8a opened toward the supporting member 11 is smaller than the area of the opening of the second branch hole 8b opened toward the supporting member 11.

Figure 9:
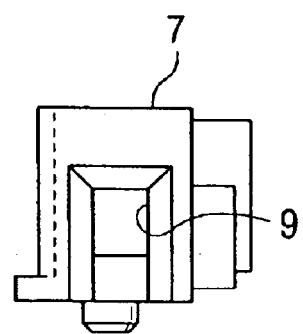
FIG. 9 is a drawing viewed in the direction indicated by an arrow C in FIG. 5.

Furthermore, as shown in FIG. 7 to FIG. 9, a filler opening 9 for filling the damper gel 10 into the hole 8 is formed on the holding member 7 at a position not facing toward the optical disk 15, e.g., in this embodiment, on both surfaces of the holding member 7 in the tracking direction.

The filler opening 9 is opened at a position away from the optical disk 15 so as to be in communication with the second branch hole 8b.

With the present embodiment constructed this way, recording and/or reproduction of information is performed by irradiating a light beam focused by the objective lens 2 onto a data track on the optical disk 15. In this case, focus servo control for focusing the spot of the light beam on the data track and tracking servo control for guiding the spot of the optical beam to follow the data track are performed.

In other words, during focus servo control, a drive current flows through the linear spring 6 to the focus coil 4 to generate an electromagnetic force in the direction of the optical axis of the objective lens 2, and the lens holder 1 is driven in the direction of the optical axis to focus the spot exactly on the data track. On the other hand, during tracking servo control, a drive current flows through the linear spring 6 to the respective tracking coils 3 to generate an electromagnetic force in the tracking direction that is orthogonal to the optical axis of the objective lens 2, and the lens holder 1 is driven in the tracking direction to guide the spot to follow the data track.

While the lens holder 1 is driven in this manner, the linear spring 6 and the supporting member 11 formed of FPC or the like function as a suspension for the action in the focusing direction and the action in the tracking direction of the lens holder 1, respectively. In this case, deflection of the lens holder 1 and the linear spring 6 in the focusing direction and deflection in the direction of rotation about the axis in the direction of the diameter of the optical disk 15 (vertical direction in FIG. 1), or pitching, are actively damped by the damper gel 10. Deflection in the direction of rotation about the lateral axis in FIG. 1, or yawing, is also damped actively by the damper gel 10.

According to the present invention thus constructed, when the damper gel 10 in the form of viscous fluid before curing is filled in the hole 8 formed on the holding member 7, the distal end of the injector, not shown, approaches the filler opening 9 in a state in which the linear spring 6 is inserted into the hole 8 in advance, and then a predetermined amount of damper gel 10 is filled at a shot under a predetermined pressure. Accordingly, the damper gel 10 is filled into the hole 8 in a state in which the damper gel 10 is in close contact with the peripheries of the respective springs 6.

In this case, the damper gel 10 injected into the hole 8 may slightly protrude from the opening of the first branch hole 8a facing toward the supporting member 11. However, since a large gap 16 is defined between the edge of the opening and the supporting member 11, the damper gel 10 is not brought into contact with the supporting member 11. The protruded damper gel 10 does not flow out into the gap 16 due to surface tension, and is drawn into the first branch hole 8a and accommodated in the first branch hole 8a after the filling operation has completed. In other words, the damper gel 10 does not fill around the linear spring 6 in the gap 16. There may be a case in which the damper gel 10 protrudes from the opening of the first branch hole 8a opened toward the supporting member 11 even after the filling operation has finished, but such protrusion may be drawn into the first branch hole 8a in the course of curing of the damper gel 10.

On the other hand, the damper gel 10 injected into the second branch hole 8b protrudes from the opening of the second branch hole 8b opened toward the supporting member 11, and comes into contact with the supporting member 11, and is pulled toward the supporting member 11 from the second branch hole 8b because of surface tension. In other words, the damper gel 10 fills around the linear spring 6 in the gap 17.

When the damper gel 10 is injected into the hole 8 as described above, because the area of the opening of the first branch hole 8a is smaller than the area of the opening of the second branch hole 8b, the damper gel 10 is more likely to flow out from the second branch hole 8b rather than the first branch hole 8a due to the difference in flow resistance. Furthermore, since the filler port 9 is in communication with the second branch hole 8b, discharge of the damper gel 10 from the second branch hole 8b to the supporting member 11 is promoted.

As described thus far, according to the present embodiment, the damper gel 10 is prevented from filling the gap 16 between the edge of the opening of the first branch hole 8a and the supporting member 11 since a wide gap 16 is provided between the edge of the opening of the first branch hole 8a opened toward the supporting member 11 and the supporting member 11, the area of the opening of the first branch hole 8a is set to a smaller value than the area of the opening of the second branch hole 8b, and the filler opening 9 is brought into communication with the second branch hole 8b of the hole 8. In other words, the damper gel 10 may be filled in such a manner that the projection (not shown) of the cleaner for wiping dirt off the objective lens 2 does not come into contact with the damper gel 10 even when the projection of the cleaner passes through the gap 16 between the edge of the opening of the first branch hole 8a and the supporting member 11. Therefore, dirt attached to the objective lens 2 may be wiped off without allowing the damper gel 10 to attach to the objective lens 2 through the projection of the cleaner, and thus the reliable cleaning action of the objective lens 2 is achieved.

Since a gap 17 on the side away from the optical disk 15 is filled with the damper gel 10, the function of suppressing vibrations of the supporting member 11 and the linear spring 6 associated with deflection of the supporting member 11 in the direction longitudinally of the linear spring 6 is not hindered and thus pitching and yawing of the linear spring 6 and the lens holder 1 may be suppressed.

Because the filler opening 9 is provided on a side surface of the holding member 7 which does not face the optical disk 15, the projection of the cleaner does not come into contact with the damper gel 10 exposed from the filler opening 9. Therefore, the damper gel 10 may be further reliably prevented from attaching to the objective lens 2.

Though two linear springs 6 are disposed on each side of the lens holder 1 in this embodiment, the invention is not limited thereto. With three or more linear springs 6 disposed on each side of the lens holder 1, the same effect as this embodiment may be achieved by keeping the proximal end of the linear spring 6 at the position nearest the optical disk 15 free from damper gel 10.

What is claimed is:

1. An optical pickup comprising:
an objective lens for converging a light beam on an optical disk;
a lens holder for holding the objective lens;
a plurality of linear spring members fixed at one end to the lens holder and fixed at the other end to a supporting member for supporting the lens holder so as to be capable of moving at least in the direction of the optical axis of the objective lens with respect to the supporting member,
a holding member provided between the lens holder and the supporting member, the holding member including holes through which the linear spring members are inserted; and
a damper gel surrounding the linear spring members to damp deflection of the linear spring members, the damper gel being held in the holes,
wherein the plurality of linear spring members are disposed in parallel at intervals in the direction of the optical axis of the objective lens, a gap is formed between the edge defining the opening of the hole opened toward the supporting member and the supporting member, and the damper gel does not fill the portion of the gap around the linear spring member at the closest position with respect to the optical disk but is filled around other linear spring members within the gap.

2. An optical pickup according to claim 1, wherein the plurality of linear spring members are disposed in parallel on both sides of the lens holder in pairs respectively, and two holes are formed in the holding member so that each linear spring member of a pair is inserted into the respective hole, and
wherein the damper gel is not filled around the linear spring members that are positioned closer to the optical disk but is filled around the linear spring members that are positioned farther from the optical disk out of the pairs of the linear spring members.

3. An optical pickup according to claim 1, wherein the hole in the holding member includes a plurality of branch holes that are branched near the opening on the supporting member side of the holding member for inserting the linear spring members respectively, and the damper gel is not filled in a gap between the supporting member and the edge defining the opening of the branch hole opened toward the supporting member at the closest position with respect to the optical disk out of the plurality of branch holes, but is filled in a gap between the supporting member and the edges defining the opening of other branch holes opened toward the supporting member.

4. An optical pickup according to claim 3, wherein the gap between the supporting member and the edge defining the opening of the branch hole at the closest position with respect to the optical disk out of the plurality of branch holes opened toward the supporting member is set to a value larger than the gap between the supporting member and the edge defining the opening of another branch hole opened toward the supporting member.

5. An optical pickup according to claim 3, wherein the area of the opening of the branch hole at the closest position with respect to the optical disk out of the plurality of branch holes is set to a value smaller than the area of the opening of other branch holes opened toward the supporting member.

6. An optical pickup according to claim 3, wherein a filler hole for filling the damper gel into the hole is provided on the holding member at a position not facing toward the optical disk.

7. An optical pickup according to claim 6, wherein the filler hole communicates with a branch hole other than the branch hole at the closest position with respect to the optical disk out of the plurality of branch holes.

8. An optical pickup comprising:
an objective lens for converging a light beam on an optical disk;

a lens holder for holding the objective lens;

a plurality of linear spring members fixed at one end to the lens holder and fixed at the other end to a supporting member for supporting the lens holder so as to be capable of moving at least in the direction of the optical axis of the objective lens with respect to the supporting member, a holding member positioned between the lens holder and the supporting member, the holding member including holes through which the linear spring members are inserted; and a damper gel surrounding the linear spring members to damp deflection of the linear spring member, the damper gel being held in the holes, wherein the plurality of linear spring members are disposed in parallel on both sides of the lens holder in pairs respectively, and two holes are formed in the holding member so that each pair of linear spring members is inserted into its respective hole, and wherein the edges of the holes opening toward the supporting member are spaced apart from the supporting member and define gaps respectively, in which the damper gel is not filled around the linear spring members positioned closer to the optical disk out of the pairs of the linear spring members but is filled around the linear spring members that are positioned farther from the optical disk out of the pairs of the linear spring members.

9. An optical pickup according to claim 8, wherein a hole in the holding member includes a pair of branch holes that are branched near the opening toward the supporting member for inserting the linear spring members respectively, and the damper gel does not fill the gap between the supporting member and the edge defining the opening of the branch hole opened toward the supporting member at the position closer to the optical disk, but fills the gap between the supporting member and the edges defining the openings of other branch holes opened toward the supporting member.

10. An optical pickup according to claim 9, wherein the gap between the supporting member and the edge defining the opening of the branch hole positioned closer to the optical disk out of the pair of branch holes opened toward the supporting member is set to a value larger than the gap between the supporting member and the edge defining the opening of the other branch hole opened toward the supporting member.

11. An optical pickup according to claim 9, wherein the area of the opening of the branch hole positioned closer to the optical disk out of the pair of branch holes opened toward the supporting member is set to a value smaller than the area of the opening of the other branch hole opened toward the supporting member.

12. An optical pickup according to claim 9, wherein a filler hole for filling the damper gel into the hole is provided on the holding member at a position not facing toward the optical disk.

13. An optical pickup according to claim 12, wherein the filler hole communicates with the branch hole positioned farther away from the optical disk out of the pair of branch holes.

14. An optical pickup comprising:

an objective lens for converging a light beam on an optical disk;

a lens holder for holding the objective lens;

a plurality of linear spring members fixed at one end to the lens holder and fixed at the other end to a supporting member for supporting the lens holder so as to be capable of moving at least in the direction of the optical axis of the objective lens with respect to the supporting member, a holding member located between the lens holder and the supporting member, the holding member including holes through which the linear spring members are inserted; and a damper gel surrounding the linear spring members to damp deflection of the linear spring members, the damper gel being held in the holes, wherein the plurality of linear spring members are disposed in parallel on both sides of the lens holder in pairs respectively so as to be spaced from each other in the direction of the optical axis of the objective lens, and two holes are formed in the holding member so that a pair of linear spring members are inserted into a respective hole, wherein the hole in the holding member includes a pair of branch holes that are branched at the side near the opening toward the supporting member side for inserting the linear spring members respectively, and the damper gel does not fill a gap between the supporting member and the edge defining the opening of the branch hole opened toward the supporting member at the position closer to the optical disk out of the pair of branch holes, but is filled around the linear spring member inserted into the other branch hole in a gap between the supporting member and the edge defining the opening of the other branch hole opened toward the supporting member.

15. An optical pickup according to claim 14, wherein the gap between the supporting member and the edge defining the opening of the branch hole at the position closer to the optical disk out of the pair of branch holes opened toward the supporting member is set to a value larger than the gap between the supporting member and the edge defining the opening of other branch hole opened toward the supporting member.

16. An optical pickup according to claim 14, wherein the area of the opening of the branch hole closer to the optical disk out of the pair of branch holes opened toward the supporting member is set to a value smaller than the area of the opening of the other branch hole opened toward the supporting member.

17. An optical pickup according to claim 14, wherein a filler hole for filling the damper gel into the hole is provided on the holding member at a position not facing toward the optical disk.

18. An optical pickup according to claim 17, wherein the filler hole communicates with the branch hole positioned farther away from the optical disk out of the pair of branch holes.

* * * * *